United States Patent [19]

Golke et al.

[11] 4,420,790

[45] Dec. 13, 1983

[54] HIGH SENSITIVITY VARIABLE CAPACITANCE TRANSDUCER

[75] Inventors: Keith W. Golke; Thomas E. Hendrickson; Charles C. Huang, all of Hennepin County, Minn.

[73] Assignee: Honeywell Inc., Minneapolis, Minn.

[21] Appl. No.: 365,071

[22] Filed: Apr. 2, 1982

[51] Int. Cl.$^3$ .......................... H01G 7/00; G01L 9/12
[52] U.S. Cl. .................................. 361/283; 29/25.42; 73/718
[58] Field of Search .......................... 361/283; 73/718; 29/25.42

[56] References Cited

U.S. PATENT DOCUMENTS

| | | | |
|---|---|---|---|
| 2,866,141 | 12/1958 | Frank et al. | 361/283 |
| 3,302,080 | 1/1967 | Dauger et al. | 361/283 |
| 4,040,118 | 8/1977 | Johnston | 361/283 |
| 4,175,428 | 11/1979 | Eilersen | 361/283 |

Primary Examiner—Donald A. Griffin
Attorney, Agent, or Firm—William T. Udseth

[57] ABSTRACT

A semiconductor capacitance transducer includes adjoining integrated sensor and reference capacitance transducers formed from silicon wafers. The transducers are parallel plate transducers which are structurally the same except that one plate of the sensor transducer is a thin force sensing diaphragm which deflects in response to selected environmental phenomena while the corresponding plate of the reference transducer is adapted to deform in response to some, but not all, of the selected environmental phenomena. By comparing the capacitance of the transducers, the effects of the phenomena which deform the reference transducer can be distinguished from the effects of the phenomena which do not deform the reference transducer. A particular application of the present invention allows thermal effects on the sensor transducer to be distinguished from the effects of pressure. Also, the sensor and reference transducers are rendered substantially free from thermal stress by constructing their plates of the same semiconductor material and electrically isolating the plates with surface passivation layers.

39 Claims, 11 Drawing Figures

HIGH SENSITIVITY VARIABLE CAPACITANCE TRANSDUCER

BACKGROUND OF THE INVENTION

1. FIELD OF THE INVENTION

This invention relates to variable semiconductor capacitance transducers and in particular to capacitance transducers adapted to measure pressure variations which include an integrated semiconductor reference capacitance transducer.

2. DESCRIPTION OF PRIOR ART

Various semiconductor variable capacitance pressure transducers have been constructed. Basically, they disclose forming one plate of a parallel plate capacitor of a semiconductor material with the other plate being a dielectric such as quartz. Generally, oppositely disposed areas on the respective plates are metallized to provide the conductive regions of the capacitor. Doping the semiconductor plate with a high impurity concentration has also been utilized to form a conductive region in the semiconductor capacitor plate. Typically, one semiconductor plate includes a thin diaphragm portion which deflects in response to a pressure differential across it.

The utility of such semiconductor pressure transducers in the microbar pressure range is greatly limited by changes in capacitance due to thermal effects. Temperature changes cause variation in plate separation due to thermal expansion or contraction of the materials between the plates. Plate area is also varied by the thermal expansion or contraction of the plates. These variations in plate separation and area are called thermal offset. Temperature changes also cause deflection of the diaphragm due to stress parallel to the surface of the plates. The stress results from differences in the coefficients of thermal expansion of the dielectric plate and the semiconductor plate. Such stress is termed thermal stress. Thermal stress increases with the thickness of the dielectric above the plates and with the area of the surface of the dielectric plate. Correction of these thermal effects problems has been left to extensive calibration and the selection of dielectrics with coefficients of thermal expansion similar to the semiconductor material.

Such calibration is expensive and time consuming and even if the coefficient of thermal expansion of the dielectric is similar to the semiconductor material, thermal off-set is still a problem. Additionally, when one plate of the capacitor is a dielectric, metallization of the dielectric surface requires additional processing in order to provide a conductive area thereupon.

Thus, the sensitivity and utility of capacitive pressure transducers would be greatly increased if the thermal effects on a capacitive transducer could be distinguished from the effects of pressure thereon. Batch processing and the fabrication of integrated circuits which included capacitive transducers would be greatly facilitated if both plates of a capacitive transducer could be made of the same semiconductor material, thus requiring only one processing line. Thermal stress would be reduced if thick dielectric materials could be eliminated from the transducer.

SUMMARY OF THE INVENTION

Accordingly, it is a principal object of the present invention to provide a variable capacitive transducer which is readilay adapted to produce an output compensated for selected environmental effects exclusive of the phenomena to be measured.

It is a further object of the present invention to provide a semiconductor capacitance transducer which can be easily batch processed.

It is another object of the present invention to provide a capacitance transducer which is substantially free from thermal stress.

It is another object of the present invention to provide a capacitance transducer which is sensitive to microbar pressure variations.

It is a further object of the present invention to provide a capacitance transducer which can be easily incorporated in IC circuits.

These objects, among others, are accomplished by providing two parallel plate capacitors (i.e. a sensor capacitor and a reference capacitor) which are constructed from semiconductor materials using standard integrated circuit processing. The capacitors are identical except that the lower plate of the sensor capacitor includes a thin, force sensing diaphragm which is adapted to deflect in response to pressure differentials across it which lie in a preselected range. The lower plate of the reference capacitor is substantially thicker than the diaphragm and is thereby adapted to remain substantially inert with respect to the selected pressure range. Because the capacitors are otherwise identical, variations in the plate separation and area of one capacitor due to forces other than those which affect the lower plates of the transducers differently (e.g., pressures lying within the preselected pressure range), will be the same as variations in the plate separation and area of the other capacitor. Thus, for example, variations in plate separation and area due to thermal expansion of the semiconductor material of the transducers (i.e., thermal offset) will be the same for both the reference and sensor capacitor. Thus, if the reference and sensor capacitors are subjected to pressure differentials across the lower plates at the same time that they are subjected to a temperature change, the difference in plate separation between the two capacitors will be due almost exclusively to pressure differentials falling within the selected range. Furthermore, the effects of thermal stress are minimized by constructing each transducer entirely of silicon, except for very thin passivation layers.

DESCRIPTION OF THE PREFERRED EMBODIMENTS

The variable capacitance pressure transducer 10 (see FIG. 3) includes two adjacent parallel plate pressure transducers 12 and 14. Transducer 12 is a variable sensor transducer and transducer 14 is a reference transducer. The lower plates of transducers 12 and 14 are formed in an N-type epitaxial layer 16 which is grown on a monocrystalline, silicon substrate wafer 18 (i.e., a first semiconductor body) of P-type conductivity having an upper flat surface 20 of (100) crystal orientation. Epitaxial layer 16 includes an upper flat principal surface 22.

Figure 1:
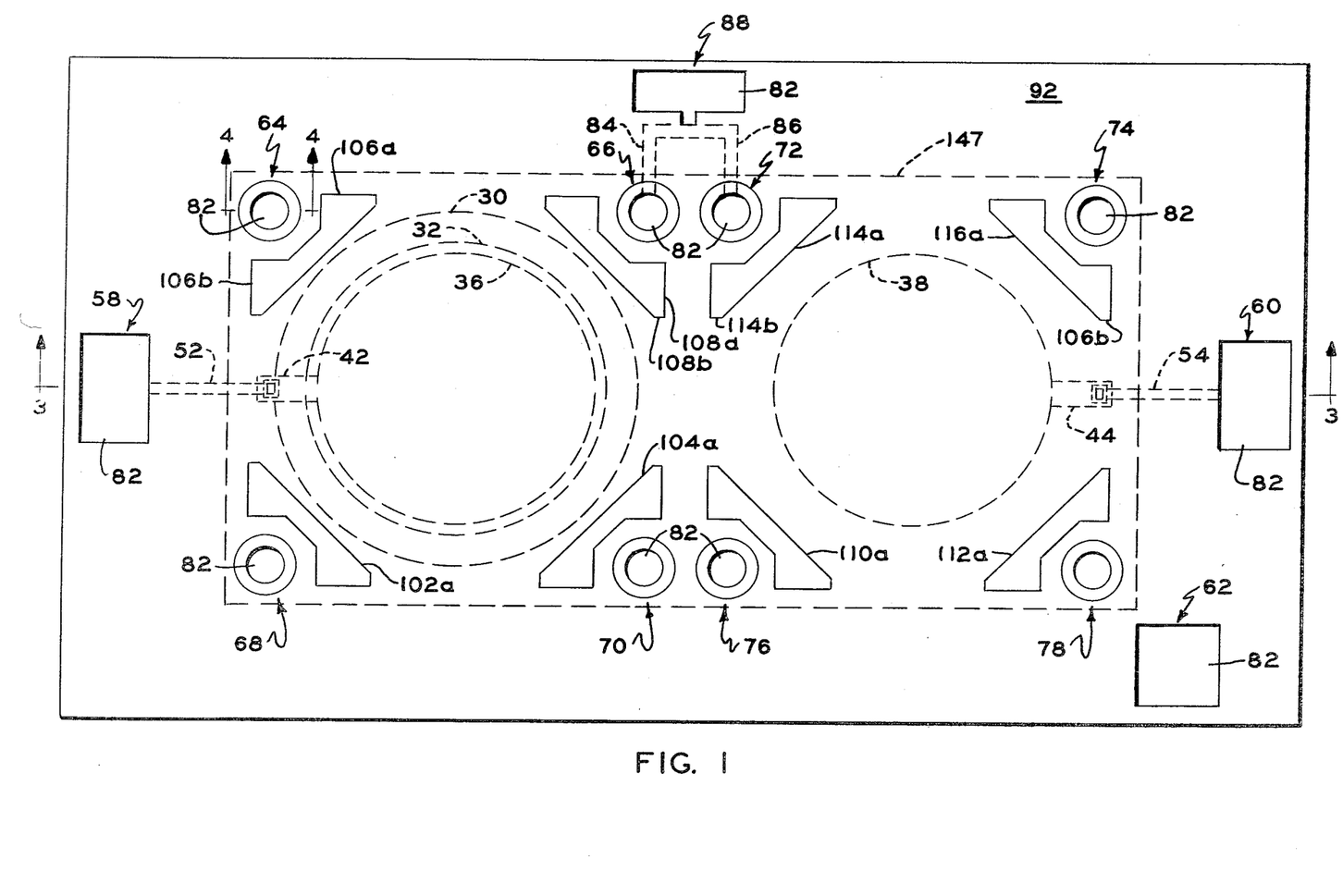
FIG. 1 is a plan view of a semiconductor wafer wherein the lower plates of the integrated sensor and reference capacitance pressure transducer are formed.
Figure 3:
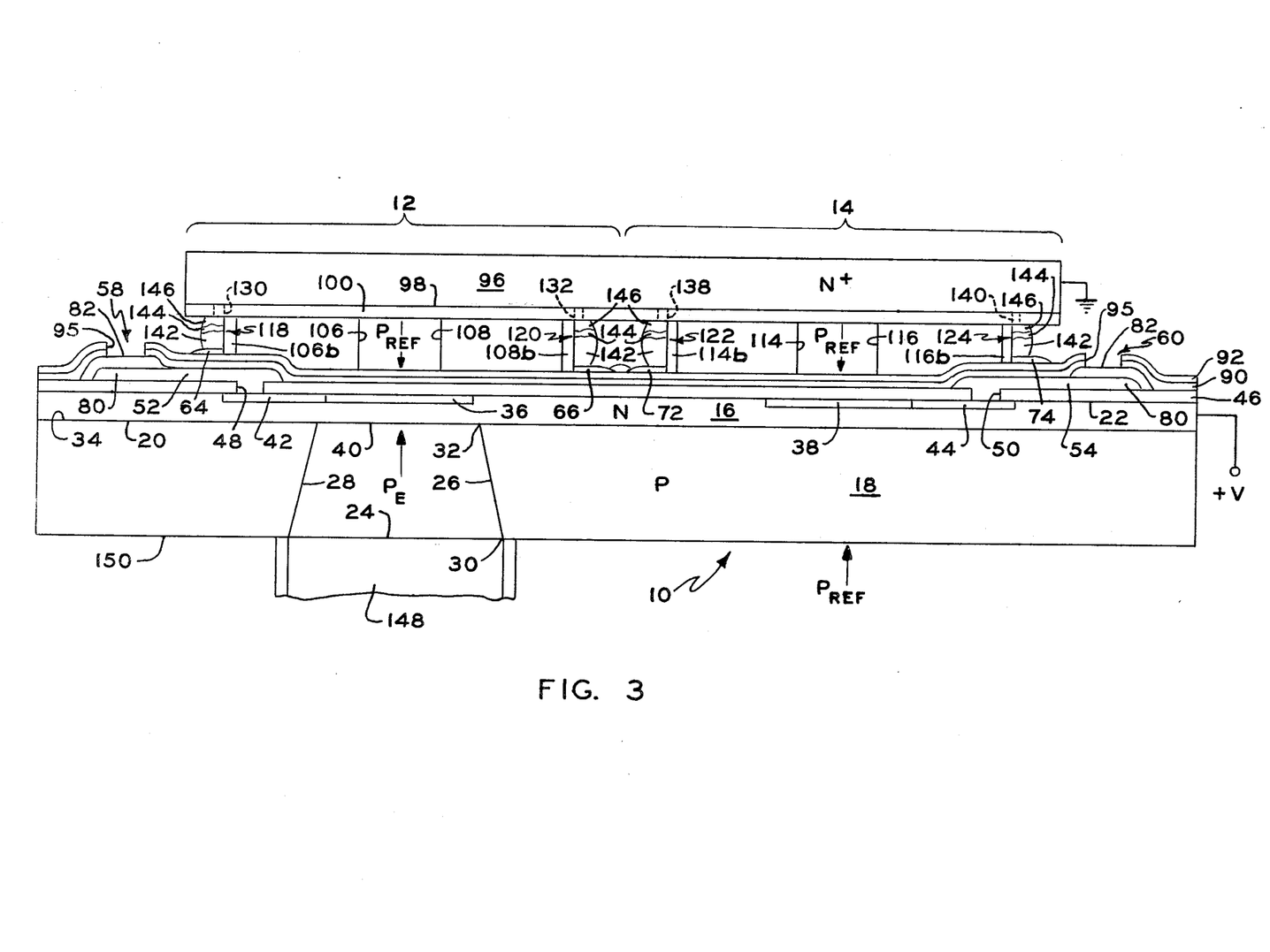
FIG. 3 is a cross-sectional view along line 3—3 of FIGS. 1 and 2 with the upper and lower plates joined.

As shown in FIGS. 1 and 3, transducers 12 and 14 are the same except for aperture 24 in substrate 18 which underlies epitaxial layer 16 in the area of sensor transducer 12. Aperture 24 will generally have tapered sides 26 and 28 which extend from rim 30 to rim 32. Aperture 24 spans the entire depth of substrate 18 and exposes the lower surface 34 of epitaxial layer 16.

The lower plates of transducers 12 and 14 are formed by P+ areas 36 and 38 which extend into epitaxial layer 16 from principal flat surface 22. Areas 36 and 38 are heavily doped to insure that they have sufficient electrical conductivity to function as capacitor plates. Areas 36 and 38 are of the same dimensions and are circular. Area 36 of sensor transducer 12 is centered within rim 32 above circular aperture 24.

The area of epitaxial layer 16 within rim 32 forms force sensing diaphragm 40. Clearly diaphragm 40 can be made of various thicknesses and of various materials. However, the thickness of and the material comprising diaphragm 40 should be chosen so that diaphragm 40 will measurably deflect in response to the application thereto of whatever force or forces are of interest. The present invention is particularly adapted to measuring pressure differentials across diaphragm 40. However, clearly transducer 12 could be adapted to measure any phenomena (as a function of capacitance) which would create a force imbalance across diaphragm 40. An example of a sensor transducer 12 which is sensitive to microbar pressure differentials across diaphragm 40 is included below.

Electrical contacts to P+ areas 36 and 38 are provided by way of P+ channels 42 and 44 which join the perimeters of P+ areas 36 and 38, respectively. Channels 42 and 44 extend into epitaxial layer 16 from surface 22 and extend outward from P+ areas 36 and 38 in opposite directions parallel to surface 22.

A first passivation layer 46 of silicon dioxide covers surface 22 of epitaxial layer 16. Contact openings 48 and 50 extend through passivation layer 46 to provide access to P+ channels 42 and 44. Metallized runs 52 and 54 run along the upper surface 56 of passivation layer 46 and contact P+ channels 42 and 44 through openings 48 and 50. Runs 52 and 54 lead to contact pads 58 and 60 respectively, which also lie on surface 56. Another contact pad 62 is formed in a third opening 64 through passivation layer 46. Contact pad 62 serves as a contact to the most positive voltage in the system to insure that N epitaxial layer 16 is at a voltage which is at least as high as that of P+ areas 36, 38, 42 and 44. This, of course, insures that the P-N junctions in epitaxial layer 16 at the interface of the P+ areas 36, 38, 42 and 44 can never be forward biased and, therefore, P+ areas 36 and 42 are electrically isolated within epitaxial layer 16 from P+ areas 38 and 44.

Eight solder bump sites 64, 66, 68, 70, 72, 74, 76 and 78 (see FIG. 1) are formed on upper surface 56 of passivation layer 46. Four of each of these bump sites are spaced around the perimeters of P+ areas 36 and 38 at 90 degree intervals. The bump sites do not penetrate layer 46. The eight bump sites along with contact pads 58, 60 and 62 are all formed of an aluminum bump 80 (see FIG. 4). Each bump is covered by a composite bonding layer 82 of chromium, copper and gold. Aluminum is utilized as the lower bump 80 since it adheres well to silicon and silicon dioxide whereas the upper layer 82 is necessary to insure a strong bond between aluminum bump 80 and the solder bumps of the upper plate (see below). Two more metallized runs 84 and 86 lead from the aluminum bumps 80 of bump sites 66 and 72 respectively, to a fourth contact pad 88. Runs 84 and 86 overlie passivation layer 46. Pad 88 is formed the same as pads 58, 60 and 62. Two additional passivation layers, a silicon nitride layer 90 and an upper silicon dioxide layer 92 overlie passivation layer 46 and runs 52, 54, 84 and 86. Eight identical openings 94 (see FIG. 4) are provided above each of the eight bump sites. Four identical openings 95 are provided above each of the contact pads 58, 60, 62 and 88.

Transducers 12 and 14 have a common upper plate 96 formed from a monocrystalline silicon wafer (i.e., a second semiconductor body, see FIG. 3). A lower principal flat surface 98 of wafer 96 is covered with a fourth passivation layer 100 of silicon dioxide. Upper plate 96 is doped with an N+ concentration of impurities to provide sufficient electrical conductivity therein for plate 96 to function as one plate of a capacitor.

Figures 2, 4:
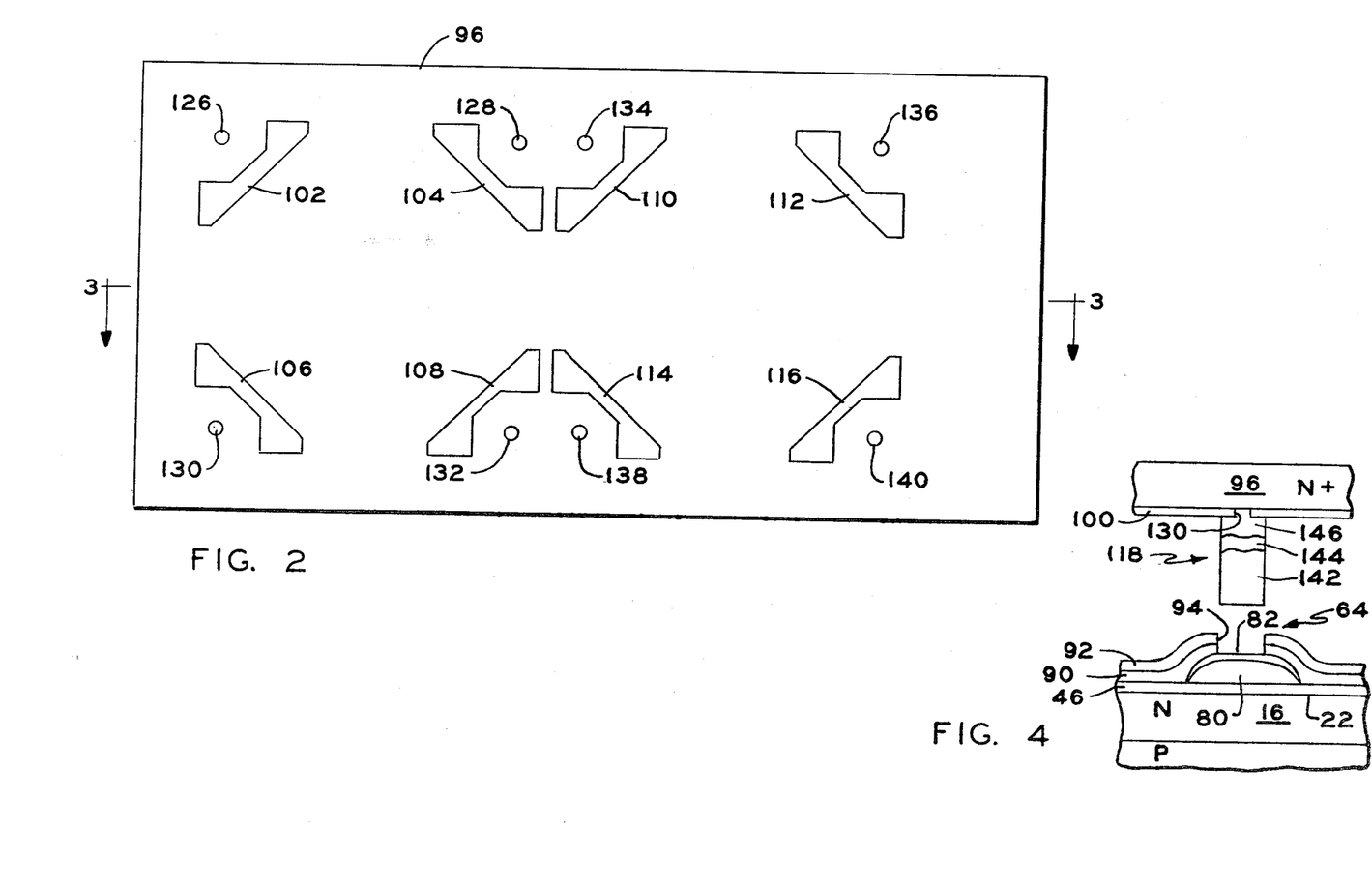
FIG. 2 is a plan view of the lower surface of the upper plates of the sensor and reference transducer.
FIG. 4 is an enlarged, partial, cross-sectional view along line 4—4 of FIG. 1 which shows a solder bump of the top capacitor plate of FIG. 3 positioned above its respective bonding pad on the lower capacitor plate.

Eight polysilicon stops 102, 104, 106, 108, 110, 112, 114 and 116 are employed to separate upper plate 98 from epitaxial layer 16 (see FIG. 2). The stops are symmetrically disposed in two groups of four around the perimeters of P+ areas 36 and 38 with a stop positioned adjacent to a bump site at one of eight stop site locations 102A, 104A, 106A, 108A, 110A, 112A, 114A and 116A (see FIG. 1). The polysilicon stops of FIG. 2 are located at the corresponding numerical polysilicon stop sites of FIG. 1, for example stop 102 is positioned at stop site 102A. The stops are secured to passivation layer 100 by any standard thin film technique such as vacuum deposition. Preferably, the stops are all of the same height to insure an equal plate separation between the plates of transducers 12 and 14 which facilitates analysis of changes in capacitance due to variations in plate separation. Also, for ease of processing, it is preferred that the stops be of the same shape and dimension.

The polysilicon stops are held firmly between passivation layers 100 and 92 by eight solder bumps 118, 120, 122, 124 (see FIG. 3) and four bumps not shown. The solder bumps are formed at eight locations on upper wafer 96 designated by eight openings 126, 128, 130, 132, 134, 136, 138 and 140 in passivation layer 100 (see FIG. 2). The eight openings in layer 100 for the solder bumps are, of course, in registered relationship with the eight bump site locations 64 through 78. Each solder bump is composed of a solder layer 142. The solder bumps are covered by a composite chromium-copper-gold bonding layer 144 and an aluminum layer 146.

As shown in FIGS. 3 and 4, the aluminum layer 146 fills openings 126 through 140 and adheres to upper silicon wafer 96. Composite layer 144 serves to join the solder layer 142 to the aluminum layer 146. FIG. 4 shows solder bump 118 at opening 130 being positioned above its respective bump site 64 prior to the joining of wafers 96 and epitaxial layer 16. Bump 118 would be joined to site 64 by solder layer 142 being positioned in opening 94 of bump site 64 and placed in firm contact with composite layer 82. Solder layer 142 would then be heated and reflowed and a secure bond would be formed between layers 142 and 82. Note that preferably each bump site opening is initially larger in diameter than the solder bumps, so that the solder bump will reflow to fill the bump site. Since all eight bumps would be contacted with their respective bump sites at the same time and bonded under the same conditions, the upper and lower plates would be pressed together by uniform pressure across passivation layers 92 and 100. Upper wafer 96 would then be positioned over substrate 18 as shown by dashed line 147 in FIG. 1.

It is preferable that the polysilicon stops and the solder bumps be located beyond the perimeters of P+ areas 36 and 38 of the transducers 12 and 14. This simplifies the parallel plate structure of transducers 12 and 14 and insures a uniform vertical electric field between the plates of the transducers. It also allows the separation of the transducer plates to vary directly in response to forces applied thereto over a large pressure range because the plates are, in effect, clamped only at the edges thereof.

The structure of the integrated capacitance transducer is completed by securing a glass tube 148 (shown in cross section in FIG. 3) to lower rim 30 of aperture 24. Note that in FIG. 3, four flattened edges 106b, 108b, 114b and 116b of stops 106, 108, 114 and 116 respectively, are presented in the cross-sectional view.

Figure 5A:
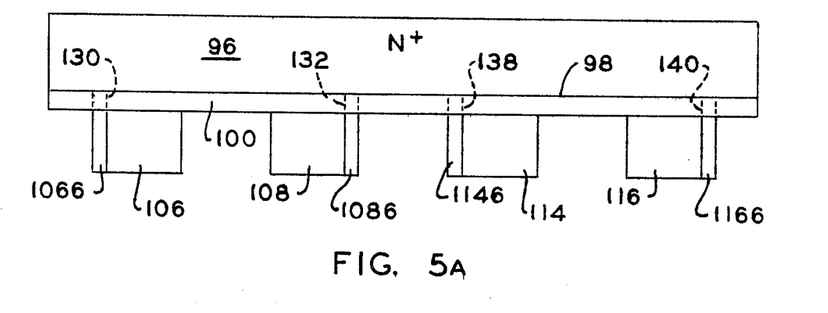
FIGS. 5A and 5B are cross-sectional views along line 3—3 of FIG. 2 showing the results of various steps in the processing of the upper plates of the capacitors.
Figure 5B:
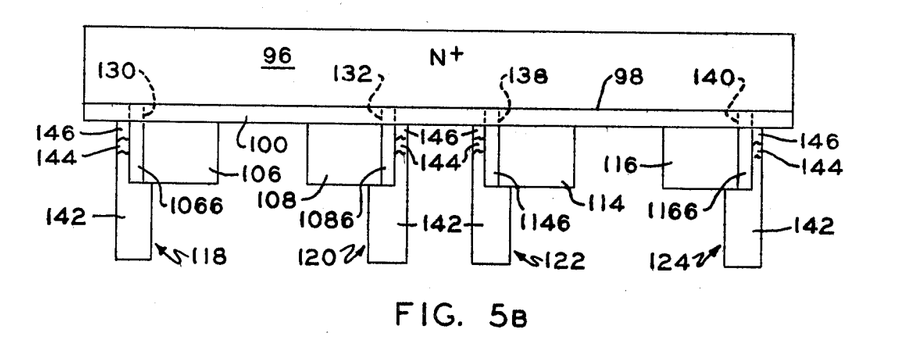

One method of making an integrated capacitance transducer according to the present invention is shown in FIGS. 5A, 5B, 6A, 6B and 6C. The various photomasks referred to in processing the upper and lower plates of device 10 are not shown. All impurity dopings can be performed by ion implantation or diffusion. FIGS. 5A and 5B show the results of various processing steps on the upper wafer 96 of device 10. With respect to FIG. 5A, a silicon upper wafer 96 with flat lower surface 98 is provided. Wafer 96 is doped with an N+ concentration. $S_iO_2$ passivation layer 100 is then grown by standard oxidizing techniques on lower surface 98. Photolithography is then employed to mask layer 100 to expose the solder bump openings (only openings 130, 132, 138 and 140 are shown in FIG. 5A). The eight solder bump openings are etched through layer 100. Standard thin film deposition is then utilized to form the eight polysilicon stops (FIG. 5A shows stops 106, 108, 114 and 116).

Referring to FIG. 5B, standard thin film deposition is again employed to form the triple layered metallization at each of the bump openings. Metallized layers 142, 144 and 146 are deposited in turn through the same thin film mask to form the solder bumps (FIG. 5B shows only bumps 118, 120, 122 and 124).

Figure 6A:
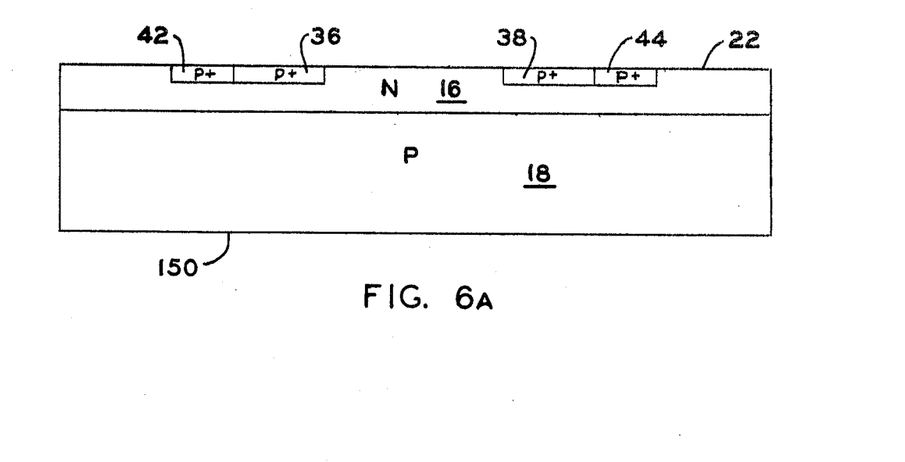
FIGS. 6A, 6B and 6C are cross-sectional views along line 3—3 of FIG. 1 showing the results of various steps in the processing of the lower plates of the capacitors.
Figure 6B:
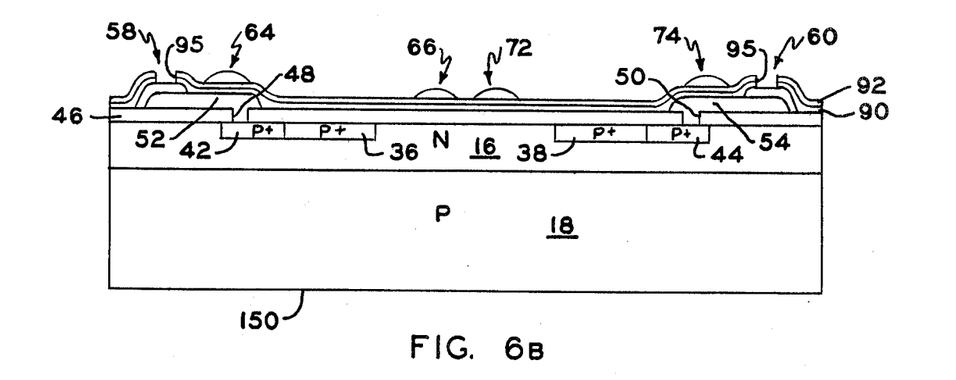
Figure 6C:
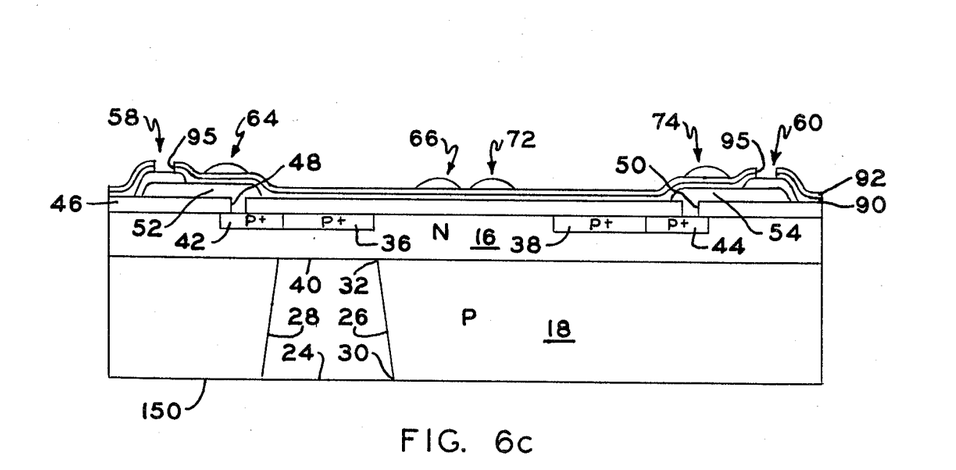

FIGS. 6A, 6B and 6C show the results of processing steps on the substrate 18 to form the lower plates. First, FIG. 6A shows that silicon substrate 18 is a P-type starting material. Epitaxial layer 16 is then grown on substrate 18 and is doped to an N concentration. A first photomask (not shown) is applied to the upper surface 22 of epitaxial layer 16. The first photomask is exposed and developed to expose areas on surface 22 immediately above areas 36 and 38, and channels 42 and 44. Areas 36 and 38, and channels 42 and 44 are doped with a P+ concentration to a depth less than the thickness of epitaxial layer 16. Since this doping step is relatively precise, ion implantation is the preferable means for forming areas 36, 38, 42 and 44.

The first photomask is removed and silicon dioxide layer 46 is then grown on upper surface 22 (see FIG. 6B). A second photomask (not shown) is employed to allow openings 48 and 50 to be etched above channels 42 and 44, respectively.

Continuing with FIG. 6B, the second photomask is removed and metallized runs 52 and 54 are provided by standard thin film deposition techniques, followed by further masking and the deposition of metallized layers 80 and 82 at each of the eight bump sites as well as at the various contact pad sites (again by standard thin film techniques). Passivation layers 90 and 92 are then deposited over passivation layer 46, the metallized runs, bump sites and contact pads. Standard photolithographic techniques are then employed to provide openings in each layer 90 and 92 at each of the eight bump sites (i.e. openings 94) and the four contact pads (i.e., openings 95).

Turning to FIG. 6C, the lower surface 150 of substrate 18 is etched to form aperture 24 to the depth of epitaxial layer 16, thereby forming diaphragm 40. As is well known, the etching rate of the N epitaxial layer is much slower than the P-substrate 18. This difference in etch rates thus facilitates the etching of aperture 24 to the depth of lower surface 34 of layer 16 by allowing a larger tolerance in timing the etching than if only a P-substrate were employed.

Finally, upper wafer 96 with the solder bumps attached is pressed against substrate 18 with the solder bumps in registered relationship with their corresponding bump sites, and the entire structure is heated to a temperature sufficient to allow the solder to reflow and adhere to layer 82 at each of the bump sites. Glass tube 148 is secured to lower surface 150 to seal the periphery of rim 30.

The general function of device 10 allows for extremely accurate and sensitive determinations of pressure differentials. As shown in FIG. 3, the pressure of the environment to be measured, i.e. $P_E$, is applied to the lower surface of diaphragm 40 by way of tube 148. A reference pressure $P_{Ref}$ is provided between the upper and lower plates of both transducers 12 and 14. $P_{Ref}$ can be supplied by enclosing device 10 in a common hermetically sealed transducer container with a portal for supplying the reference pressure. When $P_E$ differs from $P_{Ref}$, diaphragm 40 will deflect and the separation between area 36 and upper plate 96 will vary correspondingly. Since lower plate 38 of transducer 14 is not exposed to the environmental pressure, no variation of plate separation of transducer 14 will occur due to a difference in pressure between the reference pressure and environment pressure.

However, forces other than the pressure differential between $P_{Ref}$ and $P_E$ which affect the plate separation and plate area of transducer 12, can equally affect the plate separation and plate area of transducer 14. In particular, when the temperature that device 10 is subjected to changes, the various layers of materials within device 10 will expand or contract depending on the sign and magnitude of the coefficient of thermal expansion of the materials. Variations in plate separation due to the thermal expansion or contraction of materials between layer 16 and wafer 96, and variations in plate area due to the thermal expansion or contraction of wafers 18 and 96 is termed thermal off-set. Stress between adjacent, joined layers parallel to the surface of the layers due to differences in the coefficients of thermal expansion of the layers is called thermal stress.

In a device according to the present invention, variation in the plate separation and plate area of the sensor and reference transducers 12 and 14 will be the same because the vertical structure of each transducer is the same except for aperture 24 and because wafers 18 and 96 are both silicon. Expansion or contraction in the vertical direction due to a temperature change will affect the vertical position of epitaxial layer 16 (and therefore the vertical position of P+ areas 36 and 38) equally for both transducers 12 and 14 despite aperture 24. Areas 36 and 38 are the same and each will expand or contract equally because they are both formed in epitaxial layer 16. Thus, thermal off-set will be the same for both transducers 12 and 14. Therefore, since a pressure differential across diaphragm 40 will affect sensor transducer 12 but not reference transducer 14, variations in plate separation of sensor 12 due to the pressure differential can be distinguished from variations due to thermal off-set by subtracting the variation in capacitance of transducer 14 (or a corresponding electrical signal such as voltage) from the variation in capacitance of sensor transducer 12.

Furthermore, variations in plate separation of the transducers due to thermal stress are virtually eliminated. Since the transducers 12 and 14 are composed entirely of silicon other than passivation layers 46, 90, 92 and 100 and the metallization, the coefficient of thermal expansion is the same for both the upper and lower plates of each transducer. Thus, no thermal stress appears due to wafer 96, substrate 18, epitaxial layer 16 or the polysilicon stops. The metallized areas, i.e. the solder bumps and the contact pads, are very malleable with small areas of contact to wafers 18 and 96, thus their contribution to thermal stress is very small. Similarly, the passivation layers 46, 90, 92 and 100 are very thin and therefore shear forces applied to adjoining layers and silicon wafers 18 and 96 due to the passivation layers are also very small.

Nevertheless, because force sensing diaphragm 40 is much thinner than substrate 18 which underlies P+ area 38, any small but non-negligible thermal stress which might be present in device 10 due to dissimilar material resting on the silicon wafer surfaces, may deform diaphragm 40 more than principal surface 22 above P+ area 38. Thus, for an even more precise transducer, an aperture identical to aperture 24 could be formed underneath P+ area 38 of reference transducer 14, thereby making reference transducer 14 strictly equivalent to sensor transducer 12. This would insure that all variations of plate separation between transducers 12 and 14 due to thermal effects (as well as any effect to which both transducers were subjected) would be the same. If this alternative embodiment were employed and pressure differentials were to be measured, tube 148 (or its equivalent) would be a requirement to insure that the lower plate of the two transducers were not subjected to the same pressure differential. It also entails, of course, the obvious additional processing of forming two apertures instead of one.

Generally however, because the passivation layers (46, 90, 92 and 100) are so thin and the solder bumps so malleable, the structure of the present invention is sufficient to negate thermal stress effects even in the microbar pressure range without the additional aperture. In prior semiconductor transducers, thermal stress was almost totally due to the use of an upper plate of dielectric material which had a different coefficient of thermal expansion from that of the lower plate which was formed from a semiconductor material. Thermal stress increases with increased thickness of the dielectric plate and increased area of the upper dielectric plate. The present invention provides electrical isolation of the upper and lower plates by use of standard semiconductor surface passivation layers. Even totaled, the thickness of the passivation layers secured to a single wafer is generally at most several thousand angstroms (it is preferable to keep the passivation layer thickness to less than one micron). For microbar pressure variations, the contribution to thermal stress of these passivation layers to diaphragm deflection is of little consequence and is vastly less than the thermal stress due to an upper plate of a dielectric material. Further, even if the polysilicon stops are made of a material which is different from the upper or lower plates, if the height of the stops and the area of contact between these stops and the plates are small, the contribution to thermal stress by the stops will be minimal. Whatever the particular dimensions of transducers 12 or 14, thermal stress is greatly reduced from configurations where one plate is a dielectric material by replacing that dielectric material with a semiconductor plate. And, thermal stress is virtually eliminated by relying solely on standard passivation layers as the means to electrically isolate the upper and lower plates. Electrically isolating plates by means of passivation layers is, of course, a method of increasing the sensitivity of a semiconductor transducer whether that transducer is in an integrated circuit or not.

In the first embodiment, if the thickness of substrate 18 is sufficient, the entire lower surface 150 of substrate 18 could be subjected to the environmental pressure $P_E$, without employing restrictive tube 148 immediately around rim 30. This is because the thicker lower plate of reference transducer 14 would not be sensitive to the pressure range of interest and thus would remain unaffected by the difference between $P_E$ and $P_{Ref}$.

Thus, formation of the reference transducer 14 of the same materials and structure as the sensor transducer 12, except for aperture 24, allows the capacitances of transducer 12 to vary in response to forces due to a selected first phenomenon (e.g., pressure, a pressure differential or a range of pressure differentials to which diaphragm 40 will measurably deflect) and provides an integrated semiconductor capacitance transducer which can readily be adapted to produce an output which is compensated for the effects of a second phenomenon (e.g., temperature, a temperature change or a range of temperature changes). It is preferable to have the reference transducer 14 adjacent to the sensor transducer 12 so that each transducer will be subjected to virtually the identical temperature.

Of course, transducers 12 and 14 should remain far enough apart so that the electric field of one transducer does not substantially affect the electric field of the other transducer. In a parallel plate configuration, for example, the fringing of the electrical field at the ends of the plates drops off rapidly and normally its effect can be ignored beyond a distance on the order of the plate separation. Standard computations of electric field configuration and intensity can be employed if necessary to determine the distance between the reference and sensor transducer to insure independence of the capacitances of the transducers. Transducers 12 and 14 should also remain far enough apart so that the deflection of diaphragm 40 will not affect the area of principal surface 22 within P+ area 38. This distance will depend on the rigidity of the material employed, as is well known, and generally several mils is sufficient.

It has been found that in the linear range the deflection of diaphragm 40 can be obtained for pressures applied to diaphragm 40 by:

$$y = K \frac{3(1 - \nu^2)a^4}{16Et^3} P \quad \text{(Equation 1)}$$

where
y = diaphragm deflection
P = Pressure to be measured
a = diaphragm radius
t = Diaphragm thickness
E = Young's Modulus of silicon, i.e., $1.51 \times 10^{12}$ dynes/cm
$\nu$ = Poissons ratio for silicon diaphragm, i.e., 0.18.
K = a geometrical factor which is equal to 1 for the geometry of the preferred embodiment Similarly, the maximum pressure to retain linearity between pressure and deflection is given by:

$$P_{max} = \frac{8E}{3(1 - \nu^2)} \left(\frac{t}{a}\right)^4 \quad \text{(Equation 2)}$$

(Equations 1 and 2 are provided in R. J. Roark, "Formulas for Stress and Strain", Table X, Second Edition, McGraw-Hill, New York and London (1943) and S. Timoshenko and S. Woinowsky-Krieger, "Theory of Plates and Shells," McGraw-Hill, New York (1959), the contents of which are herein incorporated by reference).

Some typical dimensions of a device which could be adapted to be sensitive to microbar pressure differentials are as follows: diaphragm 40 a diameter of 60 mils; epitaxial layer 16 a thickness of 26 microns; P+ active areas 36 and 38 a diameter of 54 mils; a 6 mil gap between the diaphragm perimeter 32 and the nearest point of the polysilicon stops (i.e. distance "d" in FIG. 1); a 1,000 angstrom thickness for silicon dioxide layer 46; a 5,000 angstrom thickness for silicon nitride layer 90 and silicon dioxide layer 92 each; a 0.5 micron height for aluminum bump 80; a 1.3 micron height for composite layer 82 with the chromium being 1,500 angstroms, the copper 10,000 angstroms and the gold 1,300 angstroms; a 5 micron height for the polysilicon stops; a 1,000 angstrom thickness for silicon dioxide layer 100; a 15 mil thickness for substrate 18; a 25 mil separation between P+ areas 36 and 38; an approximately 130 mil×260 mil mil substrate 18; and an approximately 88 mil×176 mil upper wafer 96. Utilizing these dimensions, the plate separation between P+ areas 36 and 38 and the lower surface 98 of upper wafer 96 is approximately 6.2 microns (i.e. 5 micron polysilicon stop plus two 0.1 micron silicon dioxide layers 46 and 100 plus a 0.5 micron silicon dioxide layer 92 plus a 0.5 micron silicon nitride layer 90). To reduce the total thickness of passivation layers 46, 90 and 92 to less than one micron, in the event that the above dimensions contribute excessively to thermal stress, it is preferable to reduce the thickness of layers 90 and 92 to 4,000 angstroms each. The only limit with regard to the thickness of the passivation layers (or layer if only one is used to isolate wafers 18 and 96) is that they be thick enough to substantially electrically isolate wafers 18 and 96.

Isolation of P+ areas 36 and 38 by reverse biasing the P-N junctions between those areas and epitaxial area 16 introduces a junction capacitance between the epitaxial area 16 and each P+ area. These junction capacitances could limit the sensitivity of the output since the junction capacitances are in series with their respective transducer capacitances. This problem could be alleviated, for example, by designing the circuitry employing device 10 so that transducers 12 and 14 are in opposite arms of a bridge circuit wherein each arm of the bridge circuit contains an impedance formed by a capacitance equal to the capacitance of transducers 12 and 14 individually, including their respective junction capacitances. For simplicity, transducers 12 and 14, should preferably under initial conditions have the same capacitance and the same junction capacitances. As is well known, in such an impedance bridge configuration, the individual magnitudes of the capacitances will not be important and variations in capacitances 12 and 14 can be readily determined to a high degree of sensitivity. Further, the use of metal plates on dielectric wafers would avoid this junction capacitance problem and maintain capacitor isolation.

Figure 7:
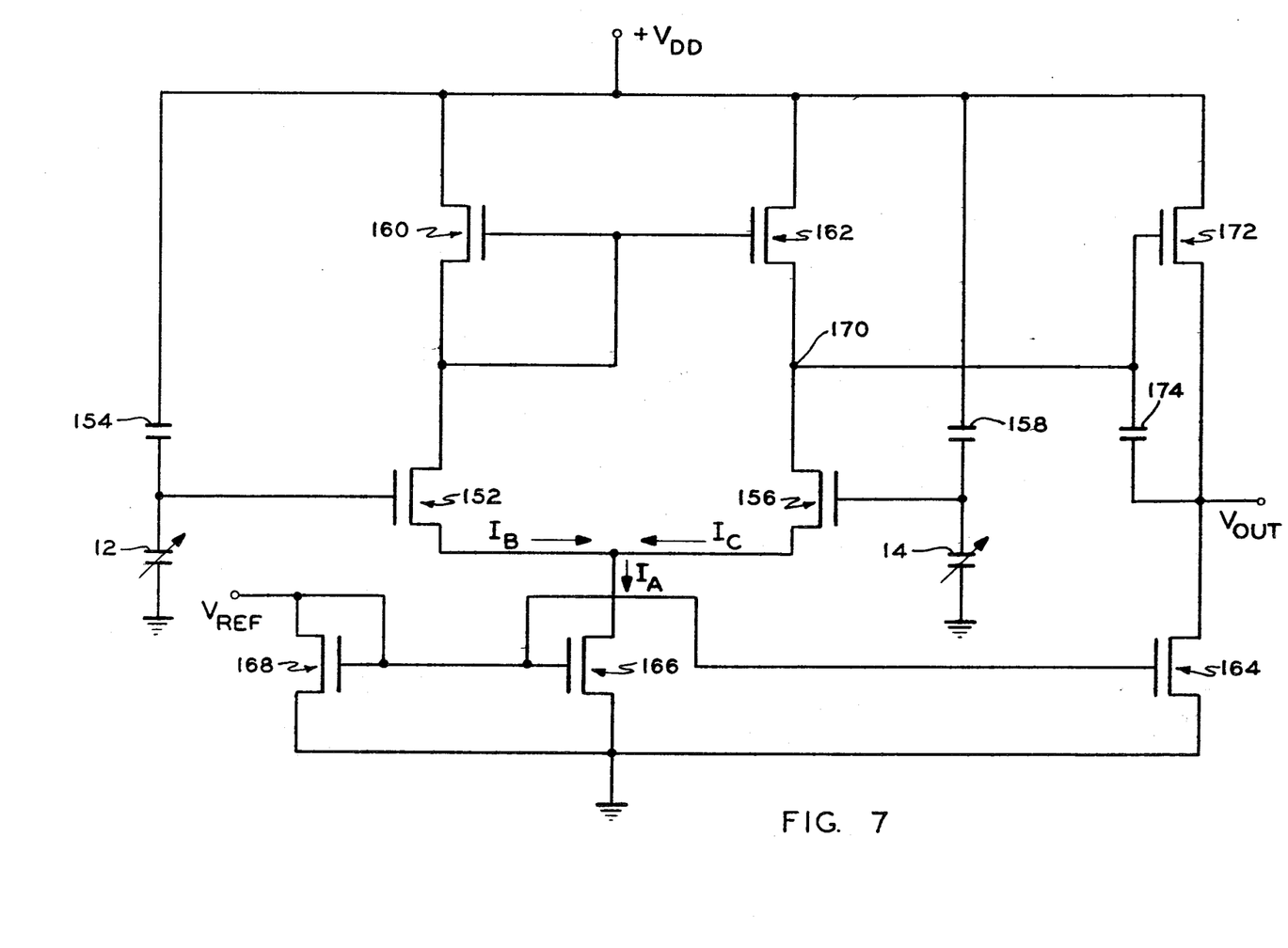
FIG. 7 is a schematic of an operational amplifier circuit within which the present invention can be utilized.

If the junction capacitances discussed above are sufficiently small so that pressure differentials across diaphragm 40 can be measured to a desired degree of accuracy, the operational amplifier circuit of FIG. 7 can be used in conjunction with device 10. The operational amplifier circuit of FIG. 7 is a typical circuit which employs eight MOSFETS. The input to the gate of MOSFET 152 is controlled by a voltage divider comprised of sensor capacitor 12 and capacitor 154. Similarly, the input to the gate of MOSFET 156 is controlled by a second voltage divider comprised of reference capacitor 14 and capacitor 158. MOSFETS 160 and 162 serve as loads to the drains of MOSFETS 152 and 156, respectively. MOSFETS 164, 166 and 168 serve as a current mirror. Nodal analysis requires that the source currents of MOSFETS 152 and 156 (i.e., IB and IC) always equal IA, which is constant. Preferably, MOSFETS 152 and 156 are identical as are MOSFETS 160 and 162, and capacitors 154 and 158.

As is well known, different input voltages to the gates of MOSFETS 152 and 156 result in a variation in the voltage at node 170. The voltage at node 170 is passed through a second stage amplifier comprised of MOSFETS 164 and 172 and capacitor 174. The final output is taken at $V_{out}$. The circuit of FIG. 7 can be incorporated in an IC with device 10. Generally, DC biasing components would be added to the circuit of FIG. 7 to set $V_{Ref}$ and to initially set the input voltages.

In operation, pressure differentials across diaphragm 40 which deflect diaphragm 40 but not the lower plate of transducer 14 will provide different input voltages to MOSFETS 152 and 156. The voltage at node 170 will vary and this variation will be amplified and the result obtained at Vout. From the values of the components in the circuit of FIG. 7, the difference in variation in capacitance of transducers 12 and 14 can be readily determined from which the variation in plate separation of transducer 12 due solely to pressure can be sound. Then the pressure differential across diaphragm 40 is easily calculated using Equation 1.

Device 10 has herein been described in terms of its use as a pressure transducer, however device 10 could be adapted to measure acceleration or any other force which would deflect diaphragm 40 substantially greater than the lower plate of transducer 14. If acceleration were of interest, diaphragm 40 could be positioned perpendicular to the direction of acceleration and P+ area 38 could be positioned along the direction of acceleration. Temperature changes would then effect transducers 12 and 14 substantially the same while the acceleration being measured would effect only the sensor transducer 12. Device 10 could be adapted to serve as a transducer with a compensated output for any force to which diaphragm 40 would be measurably deformed whereas the lower plate of transducer 14 would not. Device 10 is, of course, equally capable of serving as a transducer for steady state forces applied to the lower plates of transducers 12 and 14 as well as variational forces.

Many variations on the preferred embodiment within the scope of the claimed invention are also possible. For example, the polysilicon stops could be deleted and plate separation provided solely by the solder bumps. If a constant plate separation is employed, care must be taken in the formation of the bumps. Transducer 12 and 14 need not be the same or even similar. One could be a parallel plate capacitor and one of another configuration. Calibration of each transducers output with regard to the range of interest of pressure and temperature, or compensating circuitry, would then generally be needed to distinguish the effects of the various phenomena on the transducers. However, the geometries of the transducers could be chosen to provide a fixed relationship between the capacitances of the transducers. Further, if one desires to not integrate transducers 12 and 14 in the same wafers, the upper plates of the transducers can be on different wafers, and the lower plates of the transducers can be on different wafers (i.e., four separate semiconductor bodies would be involved). In that event, the charge holding regions in the plates of the respective transducers would generally be oppositely disposed in overlapping relationship, as is the case of the integrated circuit described above.

Figure 8:
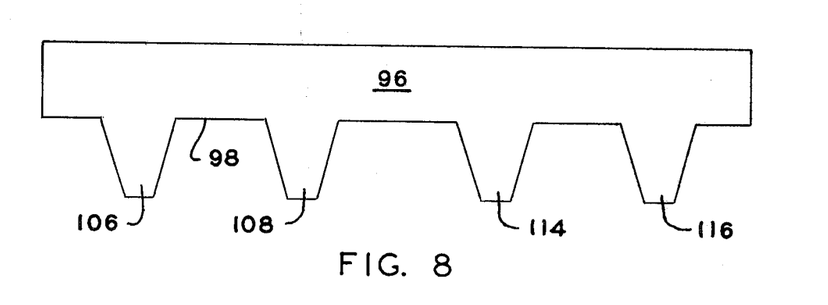
FIG. 8 is an alternative upper plate structure incorporating stops to separate the upper and lower plates.

Metal plates on dielectric layers which overlie wafers 18 and 96 can be employed instead of doped conductive areas within the wafers. If metal plates are used, wafers 18 and 96 could both be dielectrics but at a loss of ease of integration. If only one wafer of either wafers 18 or 96 were a dielectric, integration could still be accomplished but more than one processing line would then be required. Dielectric layers 90, 92 and 100 (and even layer 46 other than under the metallized runs and contact pads on wafer 18) could be eliminated, but at increased risk of deterioration of the exposed surfaces. The location of the metallized runs and contact pads can clearly be varied greatly. Wafer 96 can use two separate doped areas for the upper plates of the transducer. The conductivity types of the P and N areas could be reversed. The shape of the "plate" sensitive to the phenomena of interest need not be a thin diaphragm. Any shape which will measurably deform when exposed to the phenomena of interest is sufficient as a charge holding member of the sensor transducer. In the processing, the stops could be etched from upper plate 96 and thereby be formed of monocrystalline silicon (see FIG. 8). This list of variations is given only by way of example. It is not nor is it intended to be exhaustive of the embodiments of the device disclosed herein, those embodiments being solely defined by the claimed invention.

It can be seen from the above description that a device constructed in accordance with the description will accomplish at least all of the stated objectives.

What is claimed is:

1. A semiconductor device, comprising:
    a sensor transducer having a first portion adapted to deform upon application of forces due to first and second phenomena so that a first capacitance will vary in response to forces applied to the first portion due to both phenomena; and
    a reference transducer having a second portion adapted to deform upon application of forces due to the first phenomenon and the second portion being further adapted to remain substantially undeformed upon application of forces due to the second phenomenon, so that a second capacitance will vary in response to forces applied to the second portion due to the first phenomenon but will not vary in response to forces applied to the second portion due to the second phenomenon, and therefore variations of the first capacitance due to the first phenomenon can be distinguished from variations of the first capacitance due to the second phenomenon by comparing the variations of the first and second capacitances or electrical signals related thereto.

2. The device of claim 1 wherein the sensor transducer is included, at least in part, in a first semiconductor body, and includes first and second oppositely disposed, separated plates between which the first capacitance is determined, and wherein the deformation of the sensor transducer which results in variations of the first capacitance is the variation of the separation of the first and second plates.

3. The device of claim 2 wherein the first plate includes a force sensing diaphragm comprised of a semiconductor material having first and second oppositely disposed surfaces, and a first doped region extending into the diaphragm from the first surface thereof, the first doped region being doped with an impurity to increase the electrical conductivity thereof.

4. The device of claim 3: wherein the second plate is of a semiconductor material and includes a second doped region extending into the second plate from a first surface thereof, the second doped region being doped with an impurity to increase the electrical conductivity thereof; and further including means for substantially electrically isolating the first and second doped regions from each other.

5. The device of claim 4 further including means for separating the first and second doped regions by a substantially constant distance, with the first surface of the diaphragm facing the first surface of the second plate and with the first and second doping regions substantially overlapping.

6. The device of claim 5 wherein the reference transducer is included, at least in part, in a second semiconductor body, and includes third and fourth separated, oppositely disposed plates between which the second capacitance is determined and wherein the deformation of the reference transducer resulting in variations of the second capacitance is the variation of the separation of the third and fourth plates.

7. The device of claim 6 wherein the third plate is of a semiconductor material, and includes a third doped region extending into the third plate from a first surface thereof, the third doped region being doped with an impurity to increase the electrical conductivity thereof.

8. The device of claim 7: wherein the fourth plate is of a semiconductor material and includes a fourth doped region extending into the fourth plate from a first surface thereof, the fourth doped region being doped with an impurity to increase the electrical conductivity thereof; and further including means for substantially electrically isolating the third and fourth doped regions from each other.

9. The device of claim 8 further including: means for separating the third and fourth doped regions by a substantially constant distance, with the first surface of the third plate facing the first surface of the fourth plate and with the third and fourth doped regions substantially overlapping.

10. The device of claim 9 wherein the first, second, third and fourth plates are of the same semiconductor material.

11. The device of claim 10 wherein the first and second plates are separated by the same distance as the third and fourth plates.

12. The device of claim 11 wherein the means for substantially electrically isolating the first and second doped regions from each other and the means for substantially electrically isolating the third and fourth doped regions from each other, is a dielectric layer or layers overlying at least a portion of one of the surfaces of each of the semiconductor bodies.

13. The device of claim 12 wherein the second and fourth plates are included in the first semiconductor body.

14. The device of claim 13: wherein the first and third plates are included in the second semiconductor body; and further including means to substantially electrically isolate the doped regions within only one of either the first or second semiconductor bodies from each other.

15. The device of claim 13: wherein the first and third plates are included in the second semiconductor body; the second and fourth doped regions being contiguous, and doped with the same impurity type and with the same concentration; and further including means to substantially electrically isolate the first and third doped regions from each other.

16. The device of claim 14 or 15 wherein:
the first phenomenon is a temperature change;
the second phenomenon is a pressure differential;
the second and fourth plates are adapted to be subjected to the first phenomenon at the same time but not the second phenomenon at any time;
the first and third plates are adapted to be subjected to the first and second phenomena at the same time;
the third plate is of sufficient thickness to remain substantially undeformed upon application thereto of the second phenomenon; and
the diaphragm in the first plate is adapted to deform upon application thereto of the second phenomenon so that the first capacitance will vary in response to forces due to the temperature change and forces due to the pressure differential, and the second capacitance will vary in response to the temperature change but will not substantially vary in response to forces due to the pressure differential.

17. The device of claim 16 wherein the means for separating the plates by a constant distance includes at least one stop of the same semiconductor material as one of the semiconductor bodies, and wherein each stop has two opposed surfaces.

18. The device of claim 17 wherein the means for separating the plates further includes at least one metallized bump and wherein the first and second semiconductor bodies are adapted to be held against the opposed surfaces of the stops by the bumps.

19. The device of claim 2: wherein each of the first and second plates includes a principal surface with the principal surfaces facing one another; and further including conductive means connected to the principal surface of each plate and being adapted to provide the first capacitance therebetween.

20. The device of claim 19: wherein the conductive means is a layer of conductive material; and further including a dielectric layer between the conductive material and the principal surface of each of the first and second plates.

21. A variable capacitance semiconductor transducer with integrated reference, comprising:
a first semiconductor body adapted to hold a first charge for each of a capacitive sensor transducer and a capacitive reference transducer;
a second semiconductor body adapted to hold a second charge for each of the sensor and reference transducer in one of two separated regions which are substantially electrically isolated from each other, wherein a first portion of the second body including the charge holding region for the sensor transducer is adapted to deform in response to forces applied to the first portion due to first and second phenomena, and wherein a second portion of the second body including the charge holding region for the reference transducer is adapted to deform in response to forces applied to the second portion due to the first phenomenon and is further adapted not to deform in response to forces applied to the second portion due to the second phenomenon, so that a first capacitance which is determined between the first body and the charge holding region in the second body for the sensor transducer will vary in response to forces due to the first and second phenomena which are applied to the first portion, and a second capacitance which is determined between the first body and the charge holding region in the second body for the reference transducer will vary in response to forces due to the first phenomenon which are applied to the second portion but not in response to forces due to the second phenomenon which are applied to the second portion, and wherein the charge holding regions in the second body are sufficiently far apart so that the charge holding regions of the sensor transducer and deformations of the first portion of the second body will not substantially affect the second capacitance, and the charge holding regions of the reference transducer and deformations of the second portion of the second body will not substantially affect the first capacitance.

22. A variable capacitance semiconductor transducer with integrated reference, comprising:
a sensor transducer included, at least in part, in a semiconductor body and having at least a first portion adapted to deform upon application to the first portion of forces due to first and second phenomena so that a first capacitance will vary in response to forces applied to the first portion due to both phenomena; and
a reference transducer included, at least in part, in the semiconductor body and having a second portion adapted to deform upon application to the second portion of forces due to the first phenomenon and to remain substantially undeformed upon application to the second portion of forces due to the second phenomenon, so that a second capacitance will vary in response to forces applied to the second portion due to the first phenomenon but not forces applied to the second portion due to the second phenomenon, with the transducers being further adapted so that the sensor transducer and deformations thereof do not substantially affect the second capacitance, and the reference transducer and deformations thereof do not substantially affect the first capacitance, and therefore variations of the first capacitance due to the first phenomenon first phenomenon can be distinguished from variations of the first capacitance due to the second phenomenon by comparing variations of the first and second capacitances or electrical signals related thereto.

23. A variable capacitance semiconductor transducer with integrated reference, comprising:
a first semiconductor body; and
a second semiconductor body, wherein the bodies are adapted to provide electrically independent first and second capacitances therebetween with a first portion in one of the bodies being adapted to deform in response to forces due to first and second phenomena, so that the first capacitance will vary in response to forces due to the first and second phenomena, and with a second portion in one of the bodies being adapted to deform in response to forces due to the first phenomenon but not to forces due to the second phenomenon so that the second capacitance will vary in response to forces due to the first phenomenon but not forces due to the second phenomenon, and therefore variations of the first capacitance due to the first phenomenon can be distinguished from variations of the first capacitance due to the second phenomenon by comparing variations of the first and second capacitances or electrical signals related thereto.

24. The device of claim 23 wherein the first and second portions are both included in the first semiconductor body and the first portion includes a force sensing diaphragm.

25. The device of claim 24: wherein the first semiconductor body includes a first principal flat surface which forms at least a part of the boundary of each of the first and second portion with one surface of the force sensing diaphragm being included in the first principal flat surface; and further including a first doped region extending from the first principal flat surface into the force sensing diaphragm, and a second doped region extending from the first principal flat surface into the second portion, with the first and second doped regions being substantially electrically isolated from each other and being doped with an impurity concentration to increase the electrical conductivity of each of the first and second doped regions.

26. The device of claim 25: further including means for substantially electrically isolating the first semiconductor body from the second semiconductor body; and wherein the second semiconductor body includes a second principal flat surface which is oppositely disposed from and faces the first principal flat surface, the second semiconductor body is doped with an impurity concentration to increase the electrical conductivity thereof, the first capacitance being determined between the first doped region and the second semiconductor body and the second capacitance being determined between the second doped region and the second semiconductor body.

27. The device of claim 26 further including means to separate the first and second principal surfaces by a substantially constant distance.

28. The device of claim 27 wherein the means for substantially electrically isolating the first and second semiconductor bodies includes a passivation layer overlying at least a portion of either the first or second principal flat surfaces.

29. The device of claim 28 wherein the means for separating the first and second semiconductor bodies by a substantially constant distance includes at least one stop of a semiconductor material.

30. The device of claim 29 wherein:
the first phenomenon is a temperature change,
the second phenomenon is a pressure differential selected range,
the first semiconductor body is adapted to be subjected to the first and second phenomena,
the second semiconductor body is adapted to be subjected to the first phenomenon but not the second phenomenon,
the diaphragm is adapted to deform upon application thereto of the pressure differential and the first semiconductor body, exclusive of the diaphragm, is of sufficient thickness to remain substantially undeformed upon application thereto of the pressure differential, so that the first capacitance will vary in response to forces due to the temperature change and forces due to the pressure differential, and the second capacitance will vary in response to the temperature change but will not substantially vary in response to the pressure differential.

31. The device of claim 24: wherein a principal surface of each of the first and second semiconductor bodies faces one another; and further including a conductive means connected to one or both of the principal surfaces wherein the conductive means are adapted to be substantially electrically isolated from the semiconductor body to which they are connected.

32. The device of claim 31: wherein the conductive means is a layer of conductive material; and further including a dielectric layer between the conductive material and the connected semiconductor body.

33. A variable capacitance semiconductor transducer, comprising:
first and second semiconductor bodies of the same semiconductor material;
means for substantially electrically isolating the first and second semiconductor bodies including a layer of a dielectric material covering at least a part of the surface of one of the bodies, and wherein the bodies are adapted to provide a capacitance therebetween and wherein one of the bodies includes a force sensing portion adapted to deform in response to forces applied to the force sensing portion.

34. The device of claim 33: wherein the semiconductor material is silicon, the dielectric layer is SiO2 and the force sensing portion includes a diaphragm.

35. The method of claim 33 further including:
forming a first principal flat surface in the first semiconductor body;
forming a second principal flat surface in the second semiconductor body which is oppositely disposed to the first principal flat surface;

providing a conductive means in or on each of the flat principal surfaces;

and forming the first portion by etching the body which is to contain the first portion until a diaphragm is formed with one of the diaphragm surfaces being included in the principal surface of the body containing the first portion.

36. A method of making a variable capacitance semicondutor transducer with integrated reference, comprising the steps of:

providing a first semiconductor body;

providing a second semiconductor body with the first and second bodies being adapted to afford electrically independent first and second capacitances therebetween;

forming a first portion in one of the bodies which is adapted to deform in response to forces due to first and second phenomena so that the first capacitance will vary in response to forces due to the first and second phenomena which are applied to the first portion; and forming a second portion in one of the bodies which is adapted to deform in response to forces due to the first phenomenon but not forces due to the second phenomenon that the second capacitance will vary in response to forces due to the first phenomenon but not to forces due to the second phenomenon when forces due to the first and second phenomena are applied to the second portion.

37. A method of making a variable capacitance semiconductor transducer, comprising providing a first and a second semiconductor body of the same semiconductor material;

covering at least a part of the surface of one of the bodies with a dielectric layer, said dielectric layer being adapted to substantially electrically isolate the first and second semiconductor bodies;

providing conductive means in or on each of the semiconductor bodies so that a capacitance can be established between the conductive means in or on the first semiconductor body and the conductive means in or on the second semiconductor body;

and forming a force sensing portion in one of the bodies which includes, at least in part, the conductive means in or on that body, with the force sensing portion being adapted to deform in response to forces applied to the force sensing portion.

38. A variable capacitance semiconductor device, comprising:

a sensor transducer, included, at least in part, in a first semiconductor body and having a first force sensing portion adapted to deform upon application to the first force sensing portion of forces due to first and second phenomena, so that a first capacitance will vary in response to forces applied to the first force sensing portion due to both phenomena; and a reference transducer, included, at least in part, in a second semiconductor body and having a second force sensing portion adapted to deform in the same manner as the first force sensing portion upon application to the second force sensing portion of forces due to the first and second phenomena, so that a second capacitance will vary in the same manner as variations in the first capacitance in response to forces applied to the second force sensing portion due to both phenomena, but wherein the reference transducer is further adapted so that forces due to the first phenomenon, but not forces due to the second phenomenon, can be applied to the second force sensing portion, so that when forces due to the first and second set of phenomena are applied to the sensor and reference transducer at the same time the first capacitance will vary in response to the first and second phenomena and the second capacitance will vary in response to the first phenomena but not the second phenomenon, and therefore variations of the first capacitance due to the first phenomenon can be distinguished from variations of the first capacitance due to the second phenomenon by comparing variations of the first and second capacitances or electrical signals related thereto.

39. A method of distinguishing the effects on a variable capacitance sensor transducer, included, at least in part in a first semiconductor body, of a first phenomenon from a second phenomenon, wherein a first portion of the sensor transducer will deform in response to forces applied to the first portion due to both phenomenon and thereby cause a first capacitance to vary, comprising:

forming a reference capacitance transducer, included, at least in part, in a second semiconductor body; and forming a second portion in the reference transducer which will deform in response to forces applied to the second portion due to the first phenomenon but not in response to forces applied to the second portion due to the second phenomenon, so that a second capacitance will vary when the second portion is deformed, and therefore variations of the first capacitance due to the first phenomenon can be distinguished from variations of the first capacitance due to the second phenomenon by comparing the variations of the first and second capacitances or electrical signals related thereto.

* * * * *

UNITED STATES PATENT AND TRADEMARK OFFICE
CERTIFICATE OF CORRECTION

PATENT NO.  : 4,420,790
DATED       : DECEMBER 13, 1983
INVENTOR(S) : KEITH W. GOLKE, ET AL.

It is certified that error appears in the above-identified patent and that said Letters Patent is hereby corrected as shown below:

Column 15, line 14, cancel "first phenomenon".

Column 15, line 48, cancel "portion" and substitute --portions--.

Column 16, line 63, cancel "35" and "33", and substitute therefore --36-- and --35--, respectively.

Column 17, line 8, cancel "36" and substitute --35--.

Column 17, line 31, insert --:-- after "comprising".

Signed and Sealed this

Seventh Day of August 1984

[SEAL]

Attest:

GERALD J. MOSSINGHOFF

Attesting Officer

Commissioner of Patents and Trademarks